Patented Dec. 1, 1925.

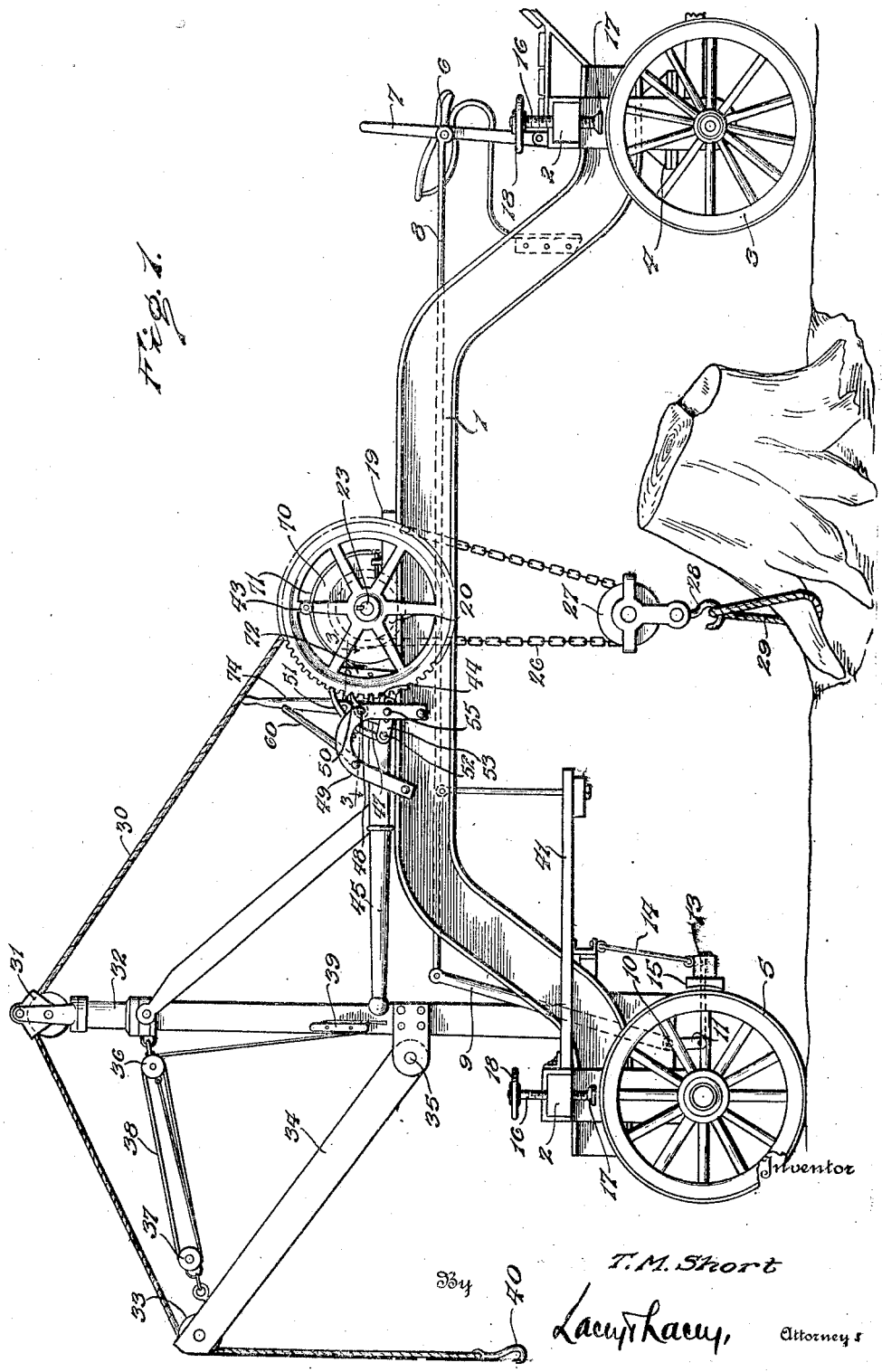

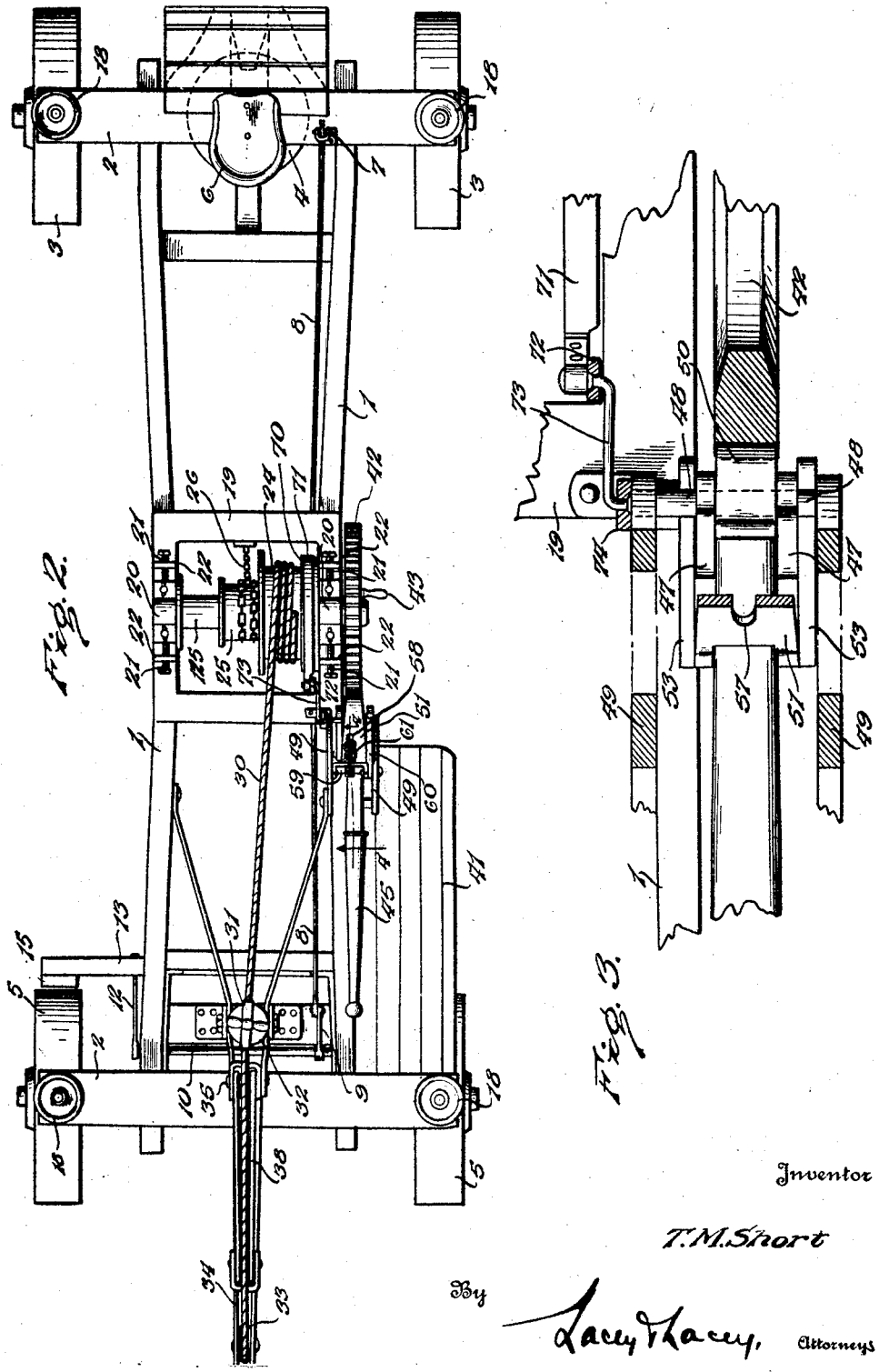

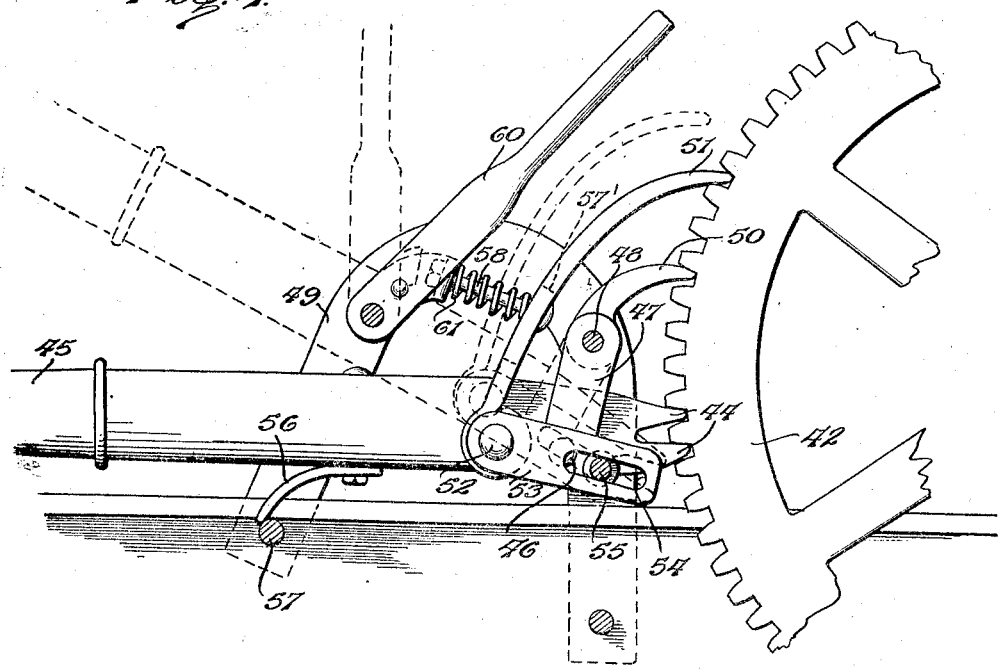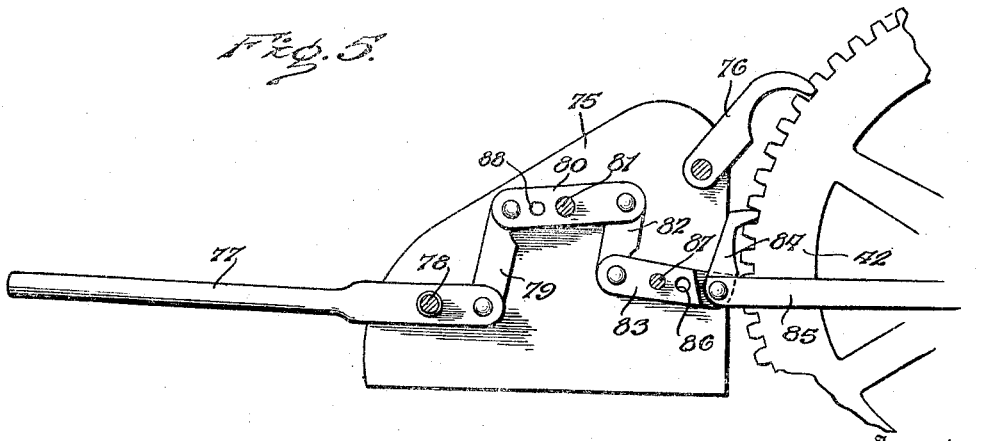

1,563,665

UNITED STATES PATENT OFFICE.

THOMAS M. SHORT, OF CAMDEN ON GAULEY, WEST VIRGINIA.

STUMP PULLER.

Application filed March 29, 1924. Serial No. 702,798.

*To all whom it may concern:*

Be it known that I, THOMAS M. SHORT, a citizen of the United States, residing at Camden on Gauley, in the county of Webster and State of West Virginia, have invented certain new and useful Improvements in Stump Pullers, of which the following is a specification.

This invention relates to stump pullers and has for its object the provision of a strong, durable and easily operated apparatus whereby stumps of trees may be readily extracted from ground which is to be cleared and transported to a point where they are to be consumed or otherwise utilized. The invention provides an apparatus which may be easily driven to the point of operation and secured firmly against movement at said point, and it also provides a simple operating mechanism whereby the stump may be easily extracted from the ground. The invention is illustrated in the accompanying drawings and will be hereinafter fully set forth.

In the drawings:

Figure 1 is a side elevation of an apparatus embodying my invention;

Fig. 2 is a plan view of the same;

Fig. 3 is an enlarged section on the line 3—3 of Fig. 1;

Fig. 4 is an enlarged section on the line 4—4 of Fig. 2, and

Fig. 5 shows a modification.

In carrying out my invention, I employ a truck comprising longitudinal beams 1 which are preferably arched between their ends, as shown in Fig. 1. The ends of these beams 1 are secured to cross beams 2 which may be of any convenient construction and the front ends of the beams are supported by wheels 3 suitably connected with a fifth wheel 4 whereby steering of the truck may be easily accomplished when it is being drawn from point to point. The rear ends of the beams 1 are supported by wheels 5 which may be mounted upon an axle supported from the cross bar or beam 2. A driver's seat 6 is supported in any convenient manner upon the front cross bar 2, and a brake lever 7 is provided adjacent the said seat. The brake lever is connected by a rod 8 with a lever 9 fixed to a shaft 10 mounted in suitable bearings supported from the rear ends of the beams 1. The ends of the shaft 10 are equipped with cranks 11 connected by links 12 with a brake beam 13 supported by hangers 14 from the beams 1 and equipped at its ends with brake shoes 15 adapted to bear against the rear wheels 5 and thereby stop the travel of the truck at any desired point. The ends of the cross bars 2 project over the respectively adjacent wheels 3 and 5, and in the ends of said cross bars are mounted pressure screws 16 having heads 17 at their lower ends adapted to bear upon the peripheries of the wheels 3 or 5, as the case may be, and equipped at their upper ends with hand wheels 18 whereby they may be manipulated. When the truck has been drawn to a point where a stump is to be extracted, the brake shoes 15 are applied so as to arrest the travel, but it is evident that it will be difficult, if not impossible, to exert such pressure through the brake shoes 15 as is needed to hold the truck absolutely stationary when the stump is being extracted and I, therefore, provide the pressure screws 16. By properly rotating the hand wheels 18, the screws will be caused to travel downwardly through the respective cross bars 2 so that the heads 17 will bear upon the ground wheels 3 and 5 to positively hold the wheels against rotation, the apparatus remaining stationary at the place of operation without the use of extraneous anchoring devices.

Upon the beams 1 at the centers thereof, I secure a supporting frame 19 which is preferably of an open rectangular form, as shown in Fig. 2. Upon the sides of this frame, I mount journal boxes 20 which are adjustable longitudinally upon the beams by means of set screws 21 mounted in lugs 22 upon the frame and engaged in the ends of the journal boxes, as will be readily understood. A windlass shaft 23 is mounted at its ends within the journal boxes 20 and between its ends the said shaft carries windlass drums 24, 25 and 125 which are so disposed as to operate within the central open portion of the frame 19. A chain 26 is secured at one end to the drum 25 and is adapted to wind thereon, the opposite end of said chain being secured to the frame 19 so that the intermediate portion of the chain forms a bight depending from the truck. In the bight of the chain is mounted a pulley 27 from which is suspended a hook 28 which is adapted to engage in a rope or chain or other device 29 secured to or around the stump in such manner as may prove most efficient under any given circumstances. If the windlass be operated to wind the chain thereon, it is evident the pulley 27 will be caused to move upwardly toward the truck and a lifting force exerted upon the stump which will quickly extract it from the ground.

A cable or chain 30 has one end secured to the windlass drum 24 and is adapted to wind thereon, the said cable or chain passing to and through a guide 31 at the upper end of a post 32 erected upon the truck at the rear end thereof. From the guide 31, the said cable or chain passes over an idler pulley 33 at the outer free end of an arm 34 which is pivoted, as at 35, upon the post 32. A block and tackle mechanism is carried by the post and the said arm 34 and comprises a pulley 36 secured upon the post in any convenient manner, a pulley 37 likewise secured to the arm, and a cable 38 secured at one end to the pulley 36 and then trained back and forth around the same and the pulley 37 eventually passing downwardly from the pulley 36 so that its free end may be secured upon a cleat 39 on the side of the post. The arm 34 may thus be readily adjusted pivotally so as to assume any desired angular inclination relative to the post 32, and the hook 40, carried by the free end of the cable 30, may be brought into position directly over a stump which is to be raised from the ground and carried to a distant point. After the hook has been properly connected with the stump or other weight, the drum 24 is operated to wind the cable 30 thereon so that the stump or other object will be raised clear of the ground and will be held in such position during travel of the truck. The cable 30 is shown and described as being wound on the drum 24 but it may, at will, be wound on the drum 25 or the drum 125, thereby giving the operator the choice of three speeds to adapt the apparatus to the weight of the object to be lifted. It will be understood, of course, that generally the chain 26 will be removed when the cable 30 is at work although they may be employed simultaneously under some conditions.

A platform 41 is supported upon the truck at the rear end and one side thereof and the operator stands upon this platform. The windlass shaft 23 is equipped at the end adjacent the said platform with a spur wheel 42, which is equipped with a handle 43 whereby it may be rapidly rotated to take up slack in the lifting cable at the start of an operation. Adjacent the wheel 42 is a lever 45 which may be easily grasped and manipulated by the operator standing upon the platform 41. The lever is provided at its front end with teeth or spurs 44 adapted to engage the teeth of the spur wheel and it is pivoted, as at 46, to the lower ends of links 47 which are pivotally mounted upon a bolt or rod 48 carried in brackets 49 which are secured upon the truck. Upon the rod or bolt 48 is pivoted a dog 50 which engages the spur wheel 42 so that retrograde movement of the spur wheel will be prevented. A pawl 51 is pivoted, as at 52, upon the lever 45 and is adapted to engage the spur wheel at a point above the dog 50, as shown. Links or straps 53 are pivoted upon the bolt or pin 52 which support the dog 51, and extend forwardly and slightly downwardly, being provided with longitudinal slots 54 engaging stop pins or studs 55 on the brackets 49. I provide a cam projection 56 on the under side of the lever which is adapted to impinge against a fixed element 57, which may be the bolt securing the brackets 49 in place, as shown most clearly in Fig. 4, upon the down stroke of the handle end of the lever. When the projection 56 engages the element 57, the lever is given a slight rearward movement which withdraws the spurs 44 from the wheel 42. The pawl 51 is provided with a longitudinal slot 57' through which is engaged a bolt 58 carried by a bail 59 pivotally secured between the brackets 49 and fixed to a lever handle 60. A spring 61 is coiled around the rod or bolt 58 between the pawl 51 and the bail 59 to hold the pawl yieldably in engagement with the spur wheel 42. It will be readily understood that, by rocking the lever 60, the pawl 51 and the teeth 44 may be drawn out of engagement with the spur wheel 42, so that they will not interfere with the hand rotation of the wheel 42 to take up slack in the lifting chain. If, in addition, the dog 50 be released, as may easily be done by hand, the wheel 42 may rotate backwardly to permit lowering of a load.

With the parts in the position shown in Fig. 4, the spur wheel will be held against movement by the engagement therewith of the lever head 44 and the dogs 50 and 51 so that a partly extracted stump will not be permitted to return to its position in the soil from which it has been excavated. A brake drum 70 is secured upon the end of the windlass 24, and a brake band 71 is disposed around the said drum. One end of this band is secured at a fixed point, while the other end thereof is secured to a lever 72 which is fulcrumed upon the truck adjacent the brake drum. A link 73 connects the upper end of said lever with a lever 74 fulcrumed upon the adjacent bracket 49. Normally, the brake band is off the drum. When a load is to be lowered, however, the speed of descent may be controlled by swinging the lever 74 to apply the band to the drum, It will be noted that the main operating lever 45 is not mounted upon a fixed fulcrum but is supported by the links 47 and 53 so that it may have a swinging movement vertically and also longitudinally of the apparatus. Assuming the lever to be in its lowest position, when it is swung upwardly, the force exerted to cause the upward movement will also cause the lever to swing slightly rearwardly as well as upwardly because the movement is directed by the links 47. The pawl 51 engaged with the spur wheel 42 will transmit the upward movement of the lever to said wheel so that the drum will be partly rotated. The upward movement of the lever will be positively arrested by contact with the bail 59 so that the lever cannot be raised to such an extent that any excessive strain will be imposed upon the operator. Upon the ensuing downward stroke of the lever, the forward end thereof will be caused to engage the spur wheel and the lever will rock about the pivot 52 of the links 53 so that the teeth or spurs 44 at the ends of the lever will then impart an additional rotation to the spur wheel. It will thus be seen that the spur wheel is actuated continuously by the lever and is given a partial rotation upon each stroke so that the stump to be extracted or the object to be raised will be very quickly lifted and the dog 50 will prevent backward rotation of the spur wheel if, for any reason, the pawl 51 or the spurs 44 should fail to properly mesh with the wheel.

In the form of the invention shown in Fig. 5, the reference numeral 75 represents one of a pair of brackets which are secured to the main frame of the machine in the same, or a similar manner, as the brackets 49 previously described are secured. A dog 76 is pivotally mounted between the upper forward corners of the brackets 75 to engage the spur wheel 42 and prevent backward rotation of the same. Between the lower rear corners of the brackets, a lever 77 is fulcrumed upon a rod or bolt 78 and the forward end of the said lever is connected by a link 79 with the rear end of an intermediate lever or rocking arm 80 which is fulcrumed between its ends, as at 81. The forward end of the lever 80 is connected by a link 82 with a third lever 83 to the front end of which is pivoted a dog 84 normally meshing with the spur wheel 42, as shown. To maintain the proper relation of the dog to the spur wheel, a keeper bar 85 may be provided, said bar being pivoted at its rear end upon the fulcrum of the dog and having its front end mounted upon the hub or shaft of the spur wheel. The lever 83 is provided with one or more openings 86, any one of which may be engaged over the fulcrum 87 and the intermediate lever 80 is likewise provided with a plurality of fulcrum openings 88, any one of which may be engaged over the fulcrum 81. The throw of the levers and, consequently, working movement of the dog 84 may thus be varied so as to move the spur wheel through a greater or less arc at each stroke of the operating lever 77. This embodiment of the invention is less expensive than the first described form and is particularly adapted for lighter work.

Having thus described the invention, I claim:

1. In an apparatus for the purpose set forth, the combination of a truck, a windlass mounted thereon, a spur wheel connected with one end of the windlass, a pivot rod on the truck adjacent the spur wheel, a link depending from said pivot rod, a lever pivoted to the lower end of said link, a toothed head on the end of the lever adapted to engage the spur wheel, and a pawl movable with the lever and projecting upwardly therefrom and adapted to engage the spur wheel.

2. In an apparatus for the purpose set forth, the combination of a truck, a windlass mounted thereon, a spur wheel secured to one end of the windlass, a lever mounted upon the truck and provided with a toothed head adapted to engage the spur wheel, a pawl pivotally mounted upon the lever and adapted to engage the spur wheel above the lever, and means for limiting the movement of the lever.

3. In an apparatus for the purpose set forth, the combination of a truck, a windlass mounted thereon, a spur wheel fixed to one end of the windlass, a lever mounted upon the truck and adapted at its working end to directly engage the spur wheel, a pawl pivotally mounted upon the lever and rising therefrom to engage the spur wheel whereby to actuate the spur wheel upon upward movement of the lever, the forward end of the lever actuating the spur wheel upon downward stroke thereof, and means disposed between the lever and the pawl for preventing backward movement of the wheel.

4. In an apparatus for the purpose set forth, the combination of a support, a windlass mounted thereon, a spur wheel connected to one end of the windlass, a lever mounted for swinging movement and adapted to directly engage the spur wheel to actuate the same, a pawl pivotally mounted upon the lever and adapted to engage and actuate the spur wheel, and means acting on the pawl yieldably holding the same in engagement with the spur wheel and operable to withdraw the pawl and the lever from engagement with said wheel.

5. In an apparatus for the purpose set forth, the combination of a support, a windlass mounted thereon, a spur wheel connected to one end of the windlass, a link mounted upon the support, an operating lever pivotally carried by the lower end of the link and adapted to engage the spur wheel, a pawl pivotally attached to the lever and rising therefrom to engage the spur wheel, means for yieldably holding the pawl in engagement with the spur wheel, and means for preventing retrograde movement of the wheel.

6. In an apparatus for the purpose set forth, the combination of a support, a windlass mounted thereon, a spur wheel connected to one end of the windlass, a link pivotally mounted upon the support, an operating lever pivoted to the lower end of said link, a second link pivoted to the operating lever in rear of the first-mentioned link and provided with a longitudinal slot in its forward portion, a stop upon the support engaged in the said longitudinal slot, a pawl pivotally mounted upon the lever and rising therefrom to engage the spur wheel and actuate the same on the up stroke of the lever, the forward end of the lever engaging and actuating the spur wheel on the down stroke of the lever, means for yieldably holding the pawl in engagement with the wheel, and means for preventing retrograde movement of the wheel.

7. In an apparatus for the purpose set forth, the combination of a support, a windlass mounted thereon, a spur wheel connected to one end of the windlass, a link pivotally mounted upon the support, an operating lever pivotally attached to the lower end of the link and adapted at its forward end to engage the spur wheel, a pawl pivotally attached to the lever and rising therefrom to engage the spur wheel, means for preventing backward movement of the wheel, means for limiting the swinging movement of the lever, a bail pivotally mounted on the support above the lever, a pin carried by said bail and having sliding engagement with the pawl, means for rocking said bail, and means disposed between the bail and the pawl for yieldably holding the pawl in engagement with the spur wheel.

8. In an apparatus for the purpose set forth, the combination of a support, a windlass mounted thereon, a spur wheel connected to one end of the windlass, a lever mounted for swinging and rocking movement upon the support and adapted at its front end to engage the spur wheel, a pawl pivoted to and rising from the lever to engage the spur wheel, a cam projection on the under side of the lever, a fixed element upon the support against which the cam projection may abut and slide whereby to impart endwise movement to the lever, and means for limiting said endwise movement.

In testimony whereof I affix my signature.

THOMAS M. SHORT.